United States Patent [19]

Erickson

[11] 4,350,571

[45] Sep. 21, 1982

[54] ABSORPTION HEAT PUMP AUGMENTED THERMAL SEPARATION PROCESS

[76] Inventor: Donald C. Erickson, 1704 S. Harbor La., Annapolis, Md. 21401

[21] Appl. No.: 195,842

[22] Filed: Oct. 10, 1980

[51] Int. Cl.$^3$ .............................................. E01D 3/14
[52] U.S. Cl. .......................................... 203/21; 62/40
[58] Field of Search ................... 203/19, 22, DIG. 4, 203/24, 25, 26, 27; 62/40, 476, 478, 477, 483, 484, 485, 486, 494–497

[56] References Cited

U.S. PATENT DOCUMENTS 1,860,554  5/1932  Ricard et al. ...................... 203/19
3,234,109  2/1966  Lustenader ........................ 203/22

Primary Examiner—Frank Sever

[57] ABSTRACT

The invention provides a process and apparatus for reducing the amount of energy which must be supplied to thermally activated separation processes such as fractional distillation, distillation, dehydration, or acid gas scrubbing. The reduction is accomplished by incorporating an absorption heat pump into the process such that the absorption heat pump accepts reject heat from (i.e. provides cooling to) the process and supplies higher temperature heat back to the process. The absorption heat pump causes the necessary temperature increase through the motive power of an external heat source applied to it, in contrast to the mechanical power source required by conventional heat pumps.

5 Claims, 2 Drawing Figures

ABSORPTION HEAT PUMP AUGMENTED THERMAL SEPARATION PROCESS

1. Technical Field

The technical field of this invention comprises separation process such as fractional distillation wherein heat is supplied to the process at a first temperature and rejected at a second temperature lower than the first, and wherein at least part of the reject heat is recovered and recycled to the supply, thereby reducing the amount of external heat which must be supplied to the process.

2. Background Art

In the process of fractional distillation, a mixed multi-component stream of liquids having different relative volatilities is subjected to multiple counter-current stages of gas liquid contact. The gas is generated by boiling at least part of the concentrated low volatility component at the bottom of the contactor in a reboiler, and reflux liquid is provided by condensing part of the concentrated high volatility gas at the top of the contactor (or fractionating column) in a reflux condenser. Thus a substantial amount of heat must be input to the process at the boiling temperature of the less volatile component, and the same amount (less losses) must be removed from the process at the lower condensing temperature of the more volatile component. This is a general characteristic of a great number of thermally activated separation processes; that heat must be supplied at a given temperature and subsequently removed at a somewhat lower temperature which may be above or below ambient. For example, acid gas removal, distillation, dehydration, drying, and many other gas purification processes have this requirement.

The large amount of relatively low temperature heat required in these processes is a problem in two regards; both the furnishing and the removal of it. Clearly a system which recycles a substantial fraction of the reject heat to the input will provide a double-edged advantage. There has long been an interest in recovering and recycling at least part of this reject heat, as attested by patents in U.S. class 203-20+ and elsewhere. Three recent journal articles summarize the current approaches to recovering and recycling this energy. The articles are: "Low Energy Separation Processes" by J. H. Bojnowski and D. L. Hanks in the May 7, 1979 issue of *Chemical Engineering* Vol. 86 No. 10; "Energy Saving Alternatives to Distillation" by F. E. Rush in the July 1980 *Chemical Engineering Progress* Vol. 76 No. 7; and "Energy Conservation in Distillation" by R. M. Stephenson and T. F. Anderson in the August 1980 *Chemical Engineering Progress* Vol. 76 No. 8. The energy recovery and recycling techniques described can be categorized as compressor driven heat pumps, vapor recompression (i.e. "open cycle" heat pump), multiple effect or split tower arrangements, interstage heating and cooling, feed stream/product stream heat exchange, and combinations of the above.

The problems with the current practice distillation energy recovery techniques are as follows. The interstage and heat exchange techniques do not actually reduce the amount of energy required, but merely reduce the temperature at which part of it is required. The multiple effect technique incorporates pressure gradients in order to achieve temperature gradients, and requires substantial additional equipment—at least one entire additional column, plus equipment to establish and maintain the pressure gradient. The compressor driven heat pump requires excessive mechanical or electrical drive power unless the column $\Delta T$ (and hence pressure ratio) is quite low. It is also expensive to procure and maintain, and in the case of the lower cost centrifugal machines, has a very limited turn down capability.

Absorption heat pumps have been known and used for many years, as indicated by patents in U.S. class 62-476+. They have predominantly been used as means for extracting heat, i.e. refrigeration or air conditioning machines, but in recent years are finding increasing application as means for supplying heat as well. Functionally the absorption heat pump is powered by an input supply of heat at high temperature, which causes it to extract (or absorb) heat at a low temperature and reject (or supply) heat at an intermediate temperature.

There are three prior art disclosures in which part of the low temperature energy rejected in a seawater distillation process is recycled to supply input distillation heat by using an absorption process. They are U.S. Pat. Nos. 3,261,766, 3,288,686, and 4,209,364. In each case part or all of the water vapor distilled out of the seawater is directly absorbed into an absorbent solution, and the heat released is indirectly transferred to the incoming seawater. The absorbent solution is regenerated for further absorption by raising its pressure and heating it from an external source, and the desorbed water vapor is condensed so as to supply additional heat to the input seawater via indirect heat exchange. The condensed water vapor is then removed from the process as all or part of the distilled water product. The disclosed teachings have several problems and limitations. First they are limited to a steam distillation, i.e. the disclosed processes would not be appropriate for fractional distillation of two or more volatile components. Secondly, since part or all of the product is processed through the absorbent solution, there is a likelihood that the absorbent solution will pick up contaminants carried over by the processed fluid, and also any special additives intentionally added to the absorbent solution to enhance its performance will tend to be flushed out. The types and functions of additives are described in U.S. Pat. Nos. 3,643,455, 3,783,631, and elsewhere. Thirdly, the steam boiled out of the generator cannot be directly injected into the seawater it heats as that would undo the separation already accomplished. Fourthly, many of the disclosed heat exchanges require latent heat (i.e. phase change) on one side of the exchanger and sensible heat (i.e. temperature change without phase change) on the other side. This is a less efficient form of heat transfer then latent heat to latent heat exchange because approach temperatures will be larger under otherwise comparable conditions. Fifthly, there is no provision for, need for, or teaching of an embodiment in which the incorporation of an absorption heat pump decreases the heat rejection temperature to below ambient temperature. Finally, there is no teaching that larger amounts of reject energy can be recovered and recycled by incorporating a two stage generator.

DISCLOSURE OF INVENTION

A thermally activated separation process is disclosed in which at least part of the higher temperature input heat which causes the process to proceed is provided by recovery and recycle of at least part of the lower temperature heat rejected from the process. The recovery and recycle is accomplished by an absorption heat pump, in which a gaseous working fluid is absorbed into an absorbent solution thereby releasing heat, and then the absorbent solution is regenerated by raising the pressure and applying external heat so as to desorb the absorbed working fluid. In one embodiment the working fluid is maintained in a closed loop: after being boiled out of the absorbent solution, it is condensed by indirect heat exchange and then boiled at lower pressure by indirect heat exchange with reject heat from the separation process. The heat released in either or both of the absorption and condensation steps is provided as input heat to the separation process via indirect heat exchange. In a second embodiment in which the separation process is fractional distillation, an open loop working fluid cycle is also possible. When its working fluid is selected from one or more of the volatile components of the bottom product, then the gaseous working fluid boiled out of the generator can be injected directly into the column bottom product, to supply distillation heat without requiring an indirect heat exchange device, such as a reboiler. Direct injection heating of a fractional distillation process is disclosed in U.S. Pat. No. 4,149,940 and elsewhere. Conversely, when the working fluid is selected from one or more of the volatile components of the overhead product, then gaseous overhead product can be directly absorbed into the absorbent solution, such that an indirect heat exchange working fluid evaporator is not required. Reflux can be provided by condensing the gaseous working fluid boiled out of the absorbent solution in the generator.

In the case of a fractional distillation process, input heat is supplied to boil part of the bottom product, e.g. in a reboiler, and reject heat is obtained as the latent heat of condensation of the overhead vapors, e.g. in a reflux condenser. Hence when it is augmented by an absorption heat pump in the disclosed manner, the highly efficient latent heat to latent heat mode of heat exchange is made possible. In all of the above embodiments, the separation process reject heat which is recovered and recycled by the absorption heat pump can just as well be below ambient temperature as above. That is, use of the absorption heat pump in the disclosed manner inherently makes it possible to provide refrigerated overhead merely by choosing the absorption pressure which yields the desired saturation temperature. Also the energy recovery achievable with all embodiments can be further increased beyond that possible with a single stage generator by incorporating a multi-effect or multistaged generator. Multiple effect absorption systems are disclosed in U.S. Pat. Nos. 3,710,852, 4,085,596, 4,183,228, and elsewhere.

With the above disclosure, the problems and limitations cited in the prior art are overcome.

BEST MODE FOR CARRYING OUT THE INVENTION

The absorption heat pump functions through the interaction of two fluid loops. In one loop, an absorbent solution is circulated between high and low pressure containment vessels. In the high pressure vessel (the generator), heat is applied to the absorbent to cause it to boil off part of its more volatile component, i.e. the working fluid, thereby strengthening the absorbent solution and generating a high pressure gaseous working fluid. In the low pressure vessel (the absorber), the strong absorbent absorbs low pressure gaseous working fluid, thereby weakening the absorbent (i.e. decreasing its affinity for gaseous working fluid) and generating heat. This loop also incorporates a heat exchanger between the strong and weak absorbent and a pump. The second loop is supplied the high pressure gas from the high pressure gas generator, condenses it, reduces its pressure, and then evaporates it, thus producing the low pressure gas required by the low pressure absorber. In the condenser, heat is rejected from the process and heat must be supplied to the evaporator.

Figure 1:
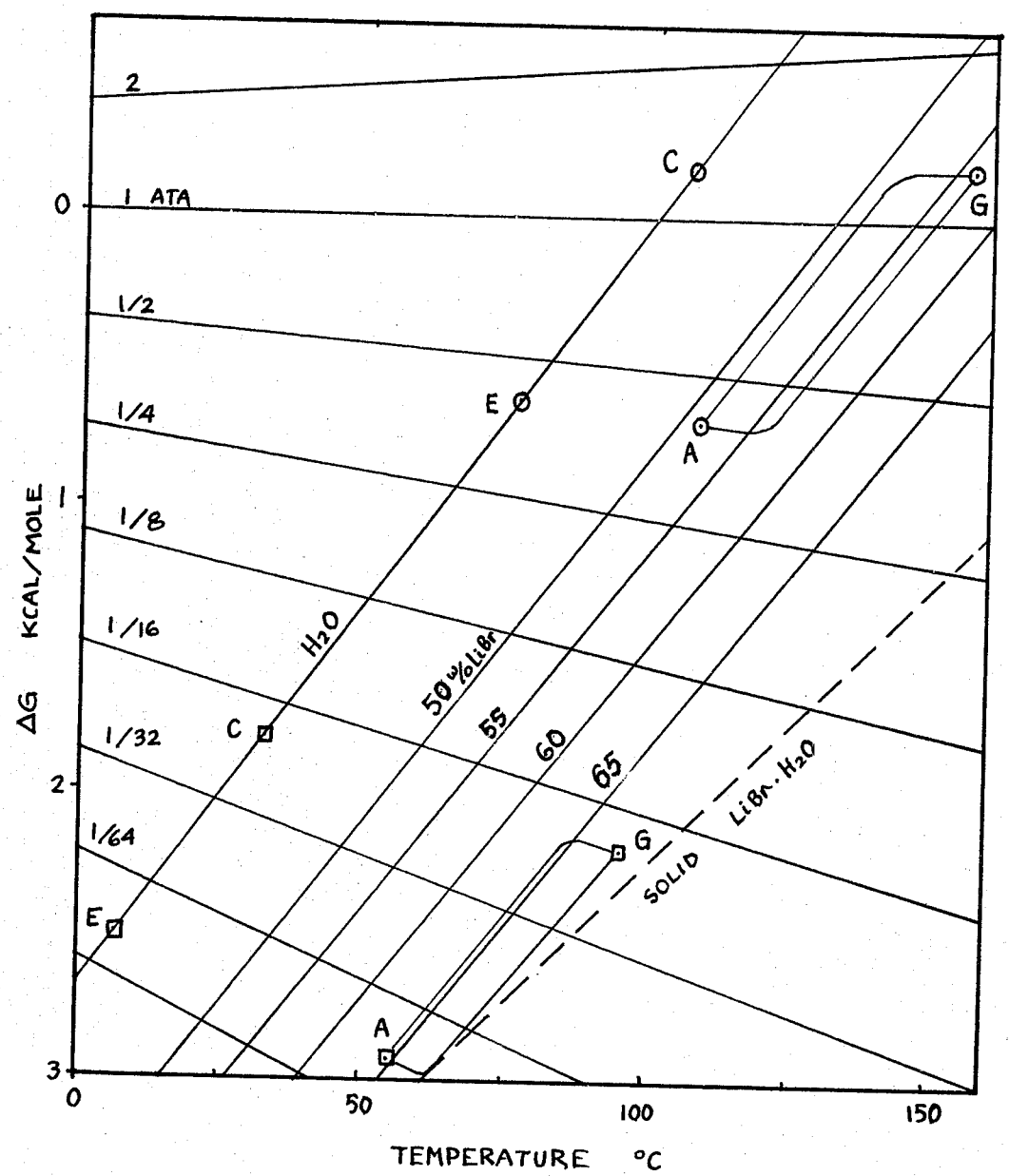
FIG. 1 illustrates the thermodynamic state points of two different absorption heat pump cycle diagrams.

FIG. 1 shows the state points of the working fluids in an absorption heat pump during one complete cycle. The figure plots the change in Gibbs free energy of the vaporization reaction vs temperature. Contours of constant pressure are indicated on the graph, according to the following relation, where R is the gas constant, T is absolute temperature, and p is pressure:

$$\Delta G = -RT \ln p$$

This graph, a variation of the Ellingham diagram, is very useful for analyzing absorption cycles. The lines of constant composition are all approximately linear (slope is the change in entropy of the change in state from liquid to gas: approximately 21 cal/degree per Trouton's rule). The graph is drawn for the conventional and well known absorbent-working fluid combination of aqueous $LiBr-H_2O$, although many other combinations are also suitable. The graph reveals the saturation temperature and pressure of the gas-liquid equilibrium as a function of solution composition.

The two sets of four circled points on the diagram correspond to the exit conditions from the four gas-liquid contact vessels of two different absorption heat pumps: G is the high pressure gas generator, C is the condenser, E is the evaporator, and A is the low pressure gas absorber.

Figure 2:
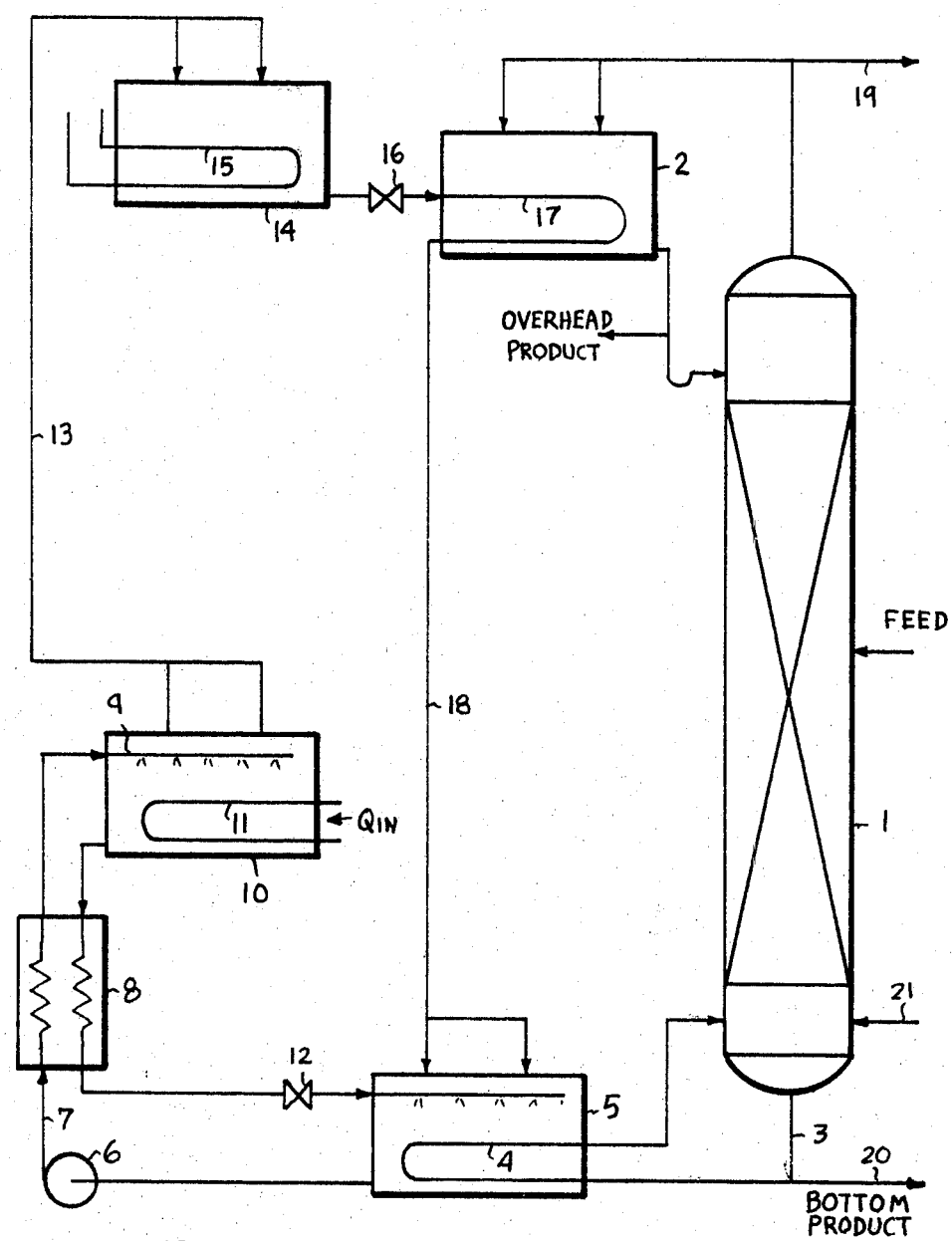
FIG. 2 is a simplified flowsheet of a fractional distillation process which has been augmented with an absorption heat pump to recover and recycle energy.

FIG. 2 illustrates one method of incorporating a closed cycle absorption heat pump (AHP) apparatus in combination with a fractional distillation (FD) apparatus such that the AHP evaporator provides at least part of the cooling required at the FD reflux condenser and the AHP absorber provides at least part of the heat required at the FD reboiler. The fractionating column 1 is supplied a feed mixture containing at least two volatile components, and fractionates it into a bottom liquid product enriched in the less volatile component and a gaseous overhead product enriched in the more volatile component. Part of the liquid bottom product withdrawn in conduit 3 is routed through reboiler 4 where it is evaporated and returned to the column. Evaporation heat is supplied by absorber 5 via indirect heat exchange. The absorbent solution absorbs gaseous working fluid in absorber 5, then is increased in pressure at least 20% in pump 6 and routed to the generator 10 via the regenerative heat exchanger B. It may optionally be sprayed into generator 10 thru spray heater 9 in order to enhance desorption. External heat supplied thru heating tubes or coils 11 causes gaseous working fluid to be boiled out of the absorbent solution, thereby regenerating the solution. It is returned to the absorber 5 via regenerative heat exchanger 8 and means for pressure reduction 12. The low pressure gaseous working fluid desorbed in the generator 10 is routed to condenser 14 via conduit 13. Heat of condensation is removed by cooling coils or tubes 15. Condensed working fluid is routed through means for pressure reduction 16 into evaporator 17, where it is evaporated and then vented in gaseous state via conduit 18 back to absorber 5. The heat of evaporation is obtained via indirect heat exchange from reflux condenser 2, in which at least part of the gaseous overhead product is condensed, and then returned as reflux and also optionally withdrawn as liquid product. The AHP is closed cycle in as much as the AHP working fluid never comes in direct contact with FD process fluids.

Ther are several species of the basic closed cycle embodiment just described. In one case the heat rejected from condenser 14 is also used to reboil bottom product. In that case part of the liquid product in conduit 20 would be routed to indirect heat exchange tubing 15, and vaporized bottom product from 15 would be returned to the column via conduit 21. In that case, the evaporator 17 would not be able to condense all overhead vapor, and part would be routed elsewhere via conduit 19, e.g. to another reflux condenser with external cooling. In this example, both the absorber and condenser will operate at approximately the same temperature—that necessary to reboil bottom product via indirect heat exchange. The cycle diagram delineated by circled points in FIG. 1 illustrates this case. It shows the AHP state points that result when an ethanol-water mixture is fed to an atmospheric pressure distillation column. Ethanol azeotrope condenses at 80° C., and hence the evaporator operates at 74° C. (6° C. $\Delta T$ across heat exchanger). Similarly the water bottom product boils at 100° C., and hence both the absorber and AHP condenser operate at 106° C. The cycle diagram shows that for those conditions the generator should be operated at 154° C. and 1.3 ATA (atmospheres absolute) pressure, and the LiBr solution should vary between 52 and 57 w/o (weight percent) in its loop. In this example, for every joule of external heat supplied to the generator, approximately 0.8 joule is recovered at the AHP evaporator, and the combined 1.8 joules are supplied to reboil bottom product. Hence a 44% savings is realized in the amount of energy supplied to the augmented process, compared to that supplied to a stand alone FD process. It should be noted that a slight further improvement in heat recovery can be realized by heat exchanging gaseous working fluid in conduit 13 against condensed working fluid enroute to the evaporator, and also gaseous working fluid in conduit 18 against part of the weak absorbent solution in conduit 7. These modifications provide greater benefits for working fluids other than $H_2O$, e.g. $NH_3$, hydrocarbons, halogenated hydrocarbons, etc. In a second configuration, the condenser 14 is supplied to a different heat sink, e.g. a separate process or a cooling tower. In that case, evaporator 17 can recover and recycle all of the reject heat, and reboiler 4 can supply all reboil heat, i.e. conduits 19 and 21 are not necessary. In that case, for every joule delivered to the reboiler approximately 1 joule must be supplied to the generator, i.e. there is ostensibly no energy savings. However the key advantage is that the evaporator can operate below ambient temperature, i.e. can provide refrigerated overhead, without any need for externally supplied refrigeration. The cycle diagram delineated by boxed points in FIG. 1 illustrates this case. A mixture of ethyl chloride ($C_2H_5Cl$—b.p. 12° C.) and dichloroethylene ($C_2H_2Cl_2$—b.p. 48° C.) is being separated by an atmospheric pressure FD process. The absorber supplying heat to the reboiler operates a 54° C., and the evaporator providing cooling to the reflux condenser operates at 6° C. The condenser which is discharging heat to a cooling tower operates at 30° C. The cycle diagram shows that the generator could be operated at 97° C. and 1/20 ATA, and the LiBr solution varies between 65 and 68 w/o.

There are two potential difficulties with the cycle just described. The low $H_2O$ pressure in the evaporator limits the heat transfer effectiveness, and the proximity of the absorber to solution crystallization conditions makes that a concern. The concern over crystallization can be alleviated by interchanging the roles of the condenser and absorber, i.e. having the condenser supply distillation heat at 54° C., and the absorber reject heat at 30° C. In that case the generator operates at 1/6 ATA and approximately the same temperature, but the solution varies between 52 and 56 w/o. The low evaporator pressure can be avoided by using a different working fluid, e.g. $NH_3$. $NH_3$ or other working fluids would also be used when evaporator temperatures below 0° C. are desired.

Although FIG. 2 reflects a very simple fractional distillation apparatus for ease of explanation, the AHP augmentation applies equally to more complex arrangements. There may be multiple columns, multiple reboilers, and/or multiple reflux condensers. A single AHP can serve multiple heat sources and sinks with a single circulating absorbent solution by providing a separate absorber plus evaporator or generator plus condenser for each temperature level. Other heat recovery techniques may be present, e.g. multiple effect distillation or compressor driven heat pumps, and AHP can advantageously be incorporated to provide even further recovery. The reboiler and/or reflux condenser can be built into the column, even including interboilers and intercondensers.

Any separation process requiring heat input at a temperature and heat rejection at a lower temperature will benefit by incorporating a closed cycle AHP to recover and recycle rejected heat back to supply heat. This includes processes in which the reject heat is below ambient temperature. Typical thermally activated separation processes involving gas purification, including the locations where heat is supplied and rejected, are described in standard chemical engineering references such as "Gas Purification" third edition by A. Kohl and F. Riesenfeld, Gulf Publishing Co., Houston Texas, 1979. For example, in many $CO_2$ scrubbing processes, heat is supplied to regenerate the scrub solution (e.g. methanol or monoethanolamine) and then heat is rejected in order to conduct the scrub reaction at low temperature. Dehydration processes are also conducted in this manner, using a glycol or electrolyte as the absorbent solution.

One additional embodiment of augmenting a FD process with an AHP is possible. That is when the AHP is open cycle, i.e. in which one of the process fluids in the FD process is also used as the AHP working fluid, and mixing of the two occurs at some point. There are two variations here, depending on whether the bottom product or overhead product is also used as working fluid, or whether the working fluid is immiscible in either product. As an example of the bottom product being also the working fluid, consider the ethanol—$H_2O$ distillation previously described. There $H_2O$ is the bottom product, and also the working fluid.

In that case, the steam in conduit 13 can be vented directly to the fractionating column 1 via conduit 21, i.e. the condenser 14 and reboiler 15 can be eliminated. The liquid water to be supplied evaporator 17 can be taken from bottom product via conduit 20 or any other convenient source. In the alternative situation, wherein the overhead product (or portions thereof) is used as the working fluid, the evaporator can be eliminated. Gaseous overhead product is routed directly to the absorber, and reflux can be supplied from the condenser or other convenient source.

All of the above embodiments can achieve even greater energy savings, i.e. reduction in external heat input at the generator, by incorporating a multiple effect generator, in which external heat is only input to the higher pressure generator, and the lower pressure generation is heated by condensation of the working fluid boiled out of the higher pressure generator.

In the FD process the amount that the reject heat temperature is below the supply heat temperature is determined by the respective boiling points of the bottom and overhead products, i.e. their respective volatilities, and also the degree of separation desired. In order for the absorber temperature to be higher than the evaporator temperature, it is necessary that solution regeneration in the generator be conducted at higher pressure than the absorber pressure. The precise pressure increase required for a given temperature elevation can be determined from the cycle diagram of the separation of interest. A nominal lower limit of a 20% increase is recited in order to define a definite bound.

Suitable absorbents for $H_2O$ working fluid include electrolytes such as alkali halides, nitrates, and hydroxides, alcohols, glycols, and mixtures thereof. Suitable absorbents for other working fluids include $H_2O$, hydrocarbons, and halogenated hydrocarbons. Process conditions must be chosen such that neither the working fluid or absorbent solution achieves solid state at any point in the cycle.

I claim:
1. In a plural stage fractional distillation process including the steps of reboiling bottom product and condensing overhead product, and wherein the overhead product condensing temperature is above ambient temperature, the improvement comprising:
   (a) providing a closed cycle absorption heat pump including an absorber with heat rejection means and a condenser with heat rejection means;
   (b) supplying the heat necessary for said reboiling step from both of said heat rejection means;
   (c) supplying the heat required by the absorption heat pump evaporator only from at least part of the above ambient temperature heat rejected by said condensing overhead product step.

2. The process according to claim 1 in which the working fluid is $H_2O$, the absorbent is comprised of an electrolyte, and the heat rejection means exchanges latent heat for latent heat.

3. The process according to claim 1 in which the absorbent solution is regenerated in a multiple effect generator, and comprising supplying external heat only to the higher pressure generator.

4. The process according to claim 1 comprising the additional step of supplying a separate source of cooling for the remaining part of said condensing overhead product heat rejection.

5. The process according to claim 4 comprising the additional steps of heat exchanging vapor from said evaporator against condensate enroute to said evaporator and heat exchanging vapor from the absorption heat pump generator against part of the absorbent solution enroute to said generator.

* * * * *